*INVENTOR.*
JOHN W. BAUR
BEUFORD E. TINDAL
*BY* Ronald M. O'Keefe

INVENTOR.
JOHN W. BAUR
BEUFORD E. TINDAL
BY [signature]

United States Patent Office 3,370,256

Patented Feb. 20, 1968

3,370,256

VARIABLE DELAY LINE

John W. Baur and Beuford E. Tindal, Phoenix, Ariz., assignors to General Electric Company, a corporation of New York Filed Sept. 14, 1964, Ser. No. 396,266
5 Claims. (Cl. 333—31)

ABSTRACT OF THE DISCLOSURE

A variable length signal delay line wherein transit time of a signal through the line may be varied.

This invention relates to delay lines and, in particular, to a delay line having a variable length whereby transit time of a signal through the line may be varied.

It is often desirable in a system employing high frequency signals to be able to adjust the propagation delay through selected circuits of the system so that the signals in the respective circuits have particular time relationships. For example, in a computer system it is often necessary that signals propagated through two different circuits arrive at a point in the system at the same time or with a predetermined time differential. Attainment of a predetermined time relationship between given signals necessitates control of the propagation delay in the signal paths. Prior art methods of delay adjustment employing artificial delay lines are disadvantageous because of their high cost and the introduction of additional components whose variability detracts from circuit performance. The present invention provides a convenient means for varying propagation delay in a circuit without employing artificial delay lines.

It is an object of the invention to provide an improved, variable length, signal delay line.

It is another object of the invention to provide a variable length, signal delay line which facilitates adjustment of the time relationship between signals.

It is a further object of the invention to provide a signal transmission line whose length is easily varied to adjust the propagation delay of a signal in the transmission line.

Briefly stated, in accordance with the illustrated embodiment of the invention, a circuit board is provided having a main signal transmission line formed thereon. A plurality of stub signal transmission lines are formed between successive pairs of points spaced along the length of the main transmission line.

The main signal transmission line is selectively interrupted between the spaced points of predetermined pairs to divert the signal from the main transmission line through corresponding stub signal transmission lines. The effective length of the signal path on the circuit board is thus increased with corresponding increase in the delay of the signal traversing the main and stub transmission lines on the circuit board. The number and the length of the stub transmission lines through which the signal is diverted may be varied to provide the desired propagation delay. The stub transmission lines which are not used are disconnected from the main transmission line to prevent undesired reflections.

The subject matter of the invention is particularly pointed out and distinctly claimed in the concluding portion of the specification. The invention, however, both as to organization and method of operation may best be understood by reference to the following description taken in connection with the accompanying drawings, in which:

Figure 1:
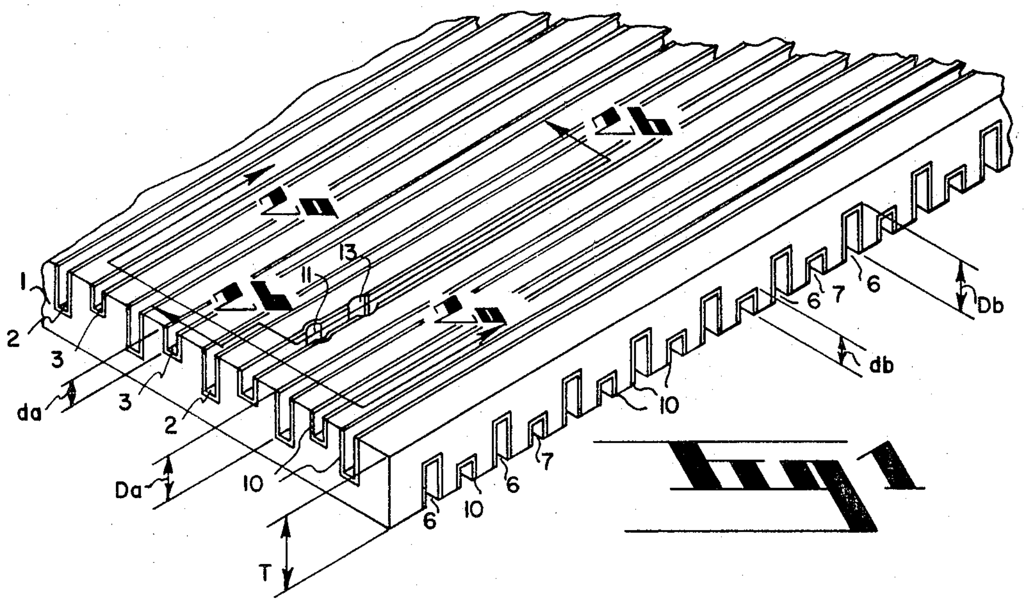
FIG. 1 is a perspective view of a portion of a circuit board interconnecting medium which is employed in the variable delay line of the invention.

With reference to FIG. 1, a panel 1 of insulative material is provided having a plurality of spaced grooves 2 and 3 formed in one side of the panel and a plurality of spaced grooves 6 and 7 formed in the other side of the panel. Panel 1, normally of predetermined and uniform thickness, may be fabricated from any suitable insulative material, for example epoxy paper sheet, and may be curved or planar depending upon application requirements.

Grooves 2 and 3, formed in one side of panel 1, are arranged to be non-intersecting and may be, for example, parallel to each other. The grooves are alternately deep and shallow, reference numeral 2 identifying the deep grooves and reference numeral 3 identifying the shallow grooves. Deep grooves 2 are formed to have a depth $D_a$ which is usually equal to at least one-half the thickness T of the panel. Shallow grooves 3 are formed to have a depth $d_a$ equal to less than one-half the thickness T of the panel. Grooves 2 and 3 may be formed in insulative panel 1 by various methods, for example, chemical etching, machining or molding.

A plurality of similarly spaced grooves 6 and 7 are formed in the side of panel 1 opposite that in which grooves 2 and 3 are formed. Grooves 6 and 7 are transverse to grooves 2 and 3 and may be, for example, perpendicular to grooves 2 and 3. Grooves 6 are similar to grooves 2 and are formed to have a depth $D_b$ which is usually equal to at least one-half the thickness T of panel 1. Alternate shallow grooves 7 are similar to grooves 3 and have a depth $d_b$ equal to less than one-half the thickness T of panel 1.

Because of the transverse relationship of deep grooves 2 and 6 in opposite sides of panel 1 and the depth to which they are formed relative to the thickness of panel 1, deep grooves 2 and 6 intersect. The depths of deep grooves 2 and 6 and of shallow grooves 3 and 7 are controlled so that the sum of $D_a+d_b$ is less than T and the sum of $D_b+d_a$ is less than T. The deep grooves in one side of panel 1 will therefore not intersect the shallow grooves in the opposite side of panel 1.

Conductors are provided in grooves 2, 3, 6 and 7 by depositing on the bottom and side walls of the grooves a conductive coating 10, such as copper. Conventional deposition techniques may be employed. The conductors in shallow grooves 3 and 7 serve as signal conductors.

The conductors in deep grooves 2 and 6 are electrically interconnected due to the continuity of the conductive material 10 between the deep grooves at their areas of intersection. The interconnected conductors in deep grooves 2 and 6 are connected to ground or to any other suitable reference potential and provide a shield for the signal conductors in shallow grooves 3 and 7, since the signal conductors in grooves 3 and 7 are completely surrounded on two sides and partially surrounded on the third side by the interconnected conductors in deep grooves 2 and 6. The network of shield conductors simulates a ground plane for the signal conductors and the structure therefore approaches the configuration of a coaxial transmission line, the signal conductors exhibiting electrical characteristics similar to those of a coaxial line. The resistance of the matrix of interconnected ground conductors is minimized by the multiple interconnection of the ground conductors at the areas of intersection of the deep grooves. The arrangement is particularly effective in minimizing noise due to cross-coupling between the signal conductors and the high frequency signal transmission characteristics of the signal conductors are therefore improved.

Selective interconnection of signal conductors on opposite sides of panel 1 may be effected by forming holes, such as indicated by reference numeral 11 in FIG. 1, which extend between predetermined shallow grooves at the point where the shallow grooves cross. The walls of connecting hole 11 are coated with conductive material 10 and the continuity of the conductive material deposited on the walls of the hole and on the walls of the shallow grooves serves to electrically interconnect the selected signal conductors on opposite sides of the panel. The conductive coating on the walls of hole 11 is preferably deposited simultaneously with the conductive coating on the walls of the grooves. This provides a continuous electrical conducting path having no ohmic junctures or mechanical type connections, such as solder or weld.

Termination of a selected signal conductor may be effected by drilling, piercing or otherwise forming a hole at a predetermined location in the shallow groove after the conductive coating has been deposited in the manner described. The diameter and depth of the terminating hole is greater than the width and depth respectively of the shallow groove so as to remove the conductive material from the side and bottom walls of the shallow groove, thereby separating the conductive material on either side of the terminating hole. A terminating hole of this type is illustrated at reference numeral 13 in FIG. 1. Alternatively, termination of signal conductors may be accomplished during the deposition operation by leaving suitably located gaps in the conductive material deposited on the walls of the shallow grooves.

Figure 2:
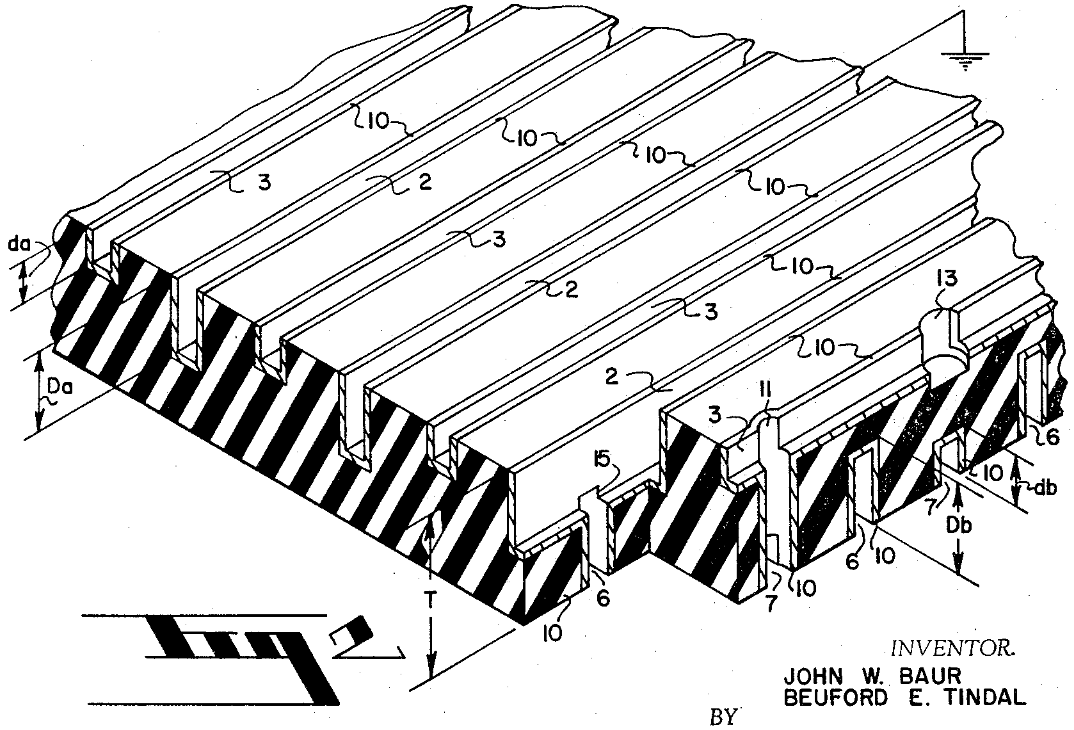
FIG. 2 is an enlarged perspective view of the circuit board structure of FIG. 1 taken in section along the lines *2a* and *2b* of FIG. 1.

FIG. 2 is an enlarged sectional perspective view of the interconnecting medium of FIG. 1 taken along the line *2a* and *2b* of FIG. 1 and shows in greater detail the structure of FIG. 1. The continuity of conductive material at the intersection of deep grooves 2 and 6 is illustrated at 15. FIG. 2 also illustrates the detail of connecting hole 11 which permits signal transmission between selected signal conductors on opposite sides of panel 1. Reference numeral 13 indicates a terminating hole which permits selected portions of a given signal conductor to be electrically separated.

In FIGS. 1 and 2, only a single connecting hole and a single terminating hole have been illustrated to simplify description. In practice, a plurality of connecting and terminating holes are formed in the circuit board at predetermined locations to form a desired circuit configuration. Thus, by forming holes in panel 1 at selected locations either before or after deposition of the conductive material, as appropriate to the desired function of the hole, a variety of circuit configurations can be fabricated without soldering, welding or changing the basic structure of the circuit board.

Figure 3:
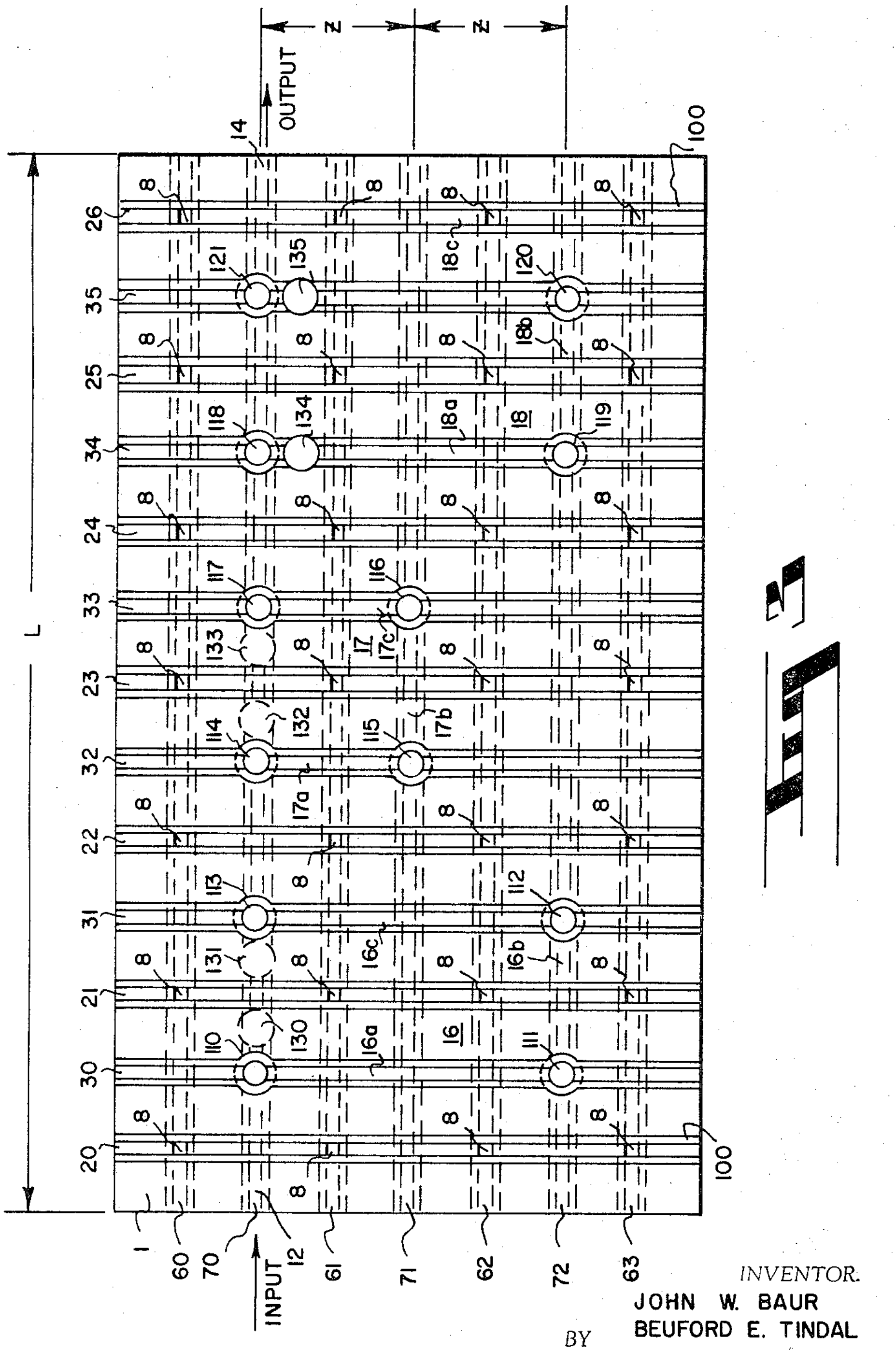
FIG. 3 is a plan view of an embodiment of a variable length signal delay line constructed in accordance with the invention.

FIG. 3 illustrates in plan view an embodiment of the variable length signal delay line of the invention employing the circuit board structure shown in FIGS. 1 and 2. Grooves 20–26 are deep grooves formed in the upper surface of panel 1 and correspond to grooves 2 of FIGS. 1 and 2. Grooves 30–35 are shallow grooves formed in the upper surface of panel 1 and correspond to grooves 3, illustrated in FIGS. 1 and 2. Grooves 60–63 are deep grooves and grooves 70–72 are shallow grooves formed in the lower surface of panel 1. Grooves 60–63 and 70–72 correspond to grooves 6 and 7 respectively of FIGS. 1 and 2.

The deep grooves in opposite sides of the panel intersect at the areas indicated by reference numeral 8. Connecting holes are formed in panel 1 at the points where shallow groove 70 crosses shallow grooves 30, 31, 32, 33, 34 and 35. Connecting holes are also formed at the points where shallow groove 71 crosses grooves 32 and 33 and at the points where shallow groove 72 crosses grooves 30, 31, 34 and 35. These connecting holes are indicated by reference numerals 110–121 in FIG. 3 and are similar to connecting hole 11 illustrated in FIGS. 1 and 2.

A coating of conductive material 100, similar to that shown at 10 in FIGS. 1 and 2, is deposited on the walls of the grooves and of the holes. The conductive coatings in grooves 20–26 and 60–63 are interconnected through intersections 8 to form a shield for the signal conductors in grooves 30–35 and 70–72.

To facilitate description of the variable delay line of the invention, the conductor in a groove will be identified and referred to by the reference numeral of the groove. Signal conductor 70 serves as the main signal transmission line, an input signal being applied to one end of conductor 70 at input terminal 12 and an output signal being derived from the other end of conductor 70 at output terminal 14. The delay experienced by a signal in the main transmission line is directionally proportional to the length L of signal conductor 70.

A stub signal transmission line 16, in parallel with the main signal transmission line between connecting holes 110 and 113, is formed by section *16a* of signal conductor 30 between connecting holes 110 and 111, section *16b* of signal conductor 72 between connecting holes 111 and 112 and section *16c* of signal conductor 31 between connecting holes 112 and 113. A similar stub transmission line 17 is formed between connecting holes 114 and 117 by sections *17a*, *17b* and *17c* of signal conductors 32, 71 and 33 respectively. Similarly, stub signal transmission line 18 between connecting holes 118 and 121 is formed by sections *18a*, *18b* and *18c* of signal conductors 34, 72 and 35 respectively.

The propagation delay experienced by a signal transmitted from input terminal 12 to output terminal 14 may be varied by diverting the signal from the main transmission line 70 through one or more of the stub transmission lines 16, 17 and 18, thereby increasing the effective length of the signal path between the input and output terminals. A signal applied to input terminal 12 of conductor 70 may be diverted through stub transmission line 16 by formation of terminating holes 130 and 131 in the main transmission line signal conductor 70 between connecting holes 110 and 113. Similarly, the signal may again be diverted through stub transmission line 17 by formation of terminating holes 132 and 133 in main transmission line signal conductor 70 between connecting holes 114 and 117. Upon attainment of a desired propagation delay, the remaining stub transmission lines may be isolated from the main transmission line and undesirable signal reflections avoided by formation of terminating holes in the stub transmission line signal conductors adjacent the main transmission line. Thus, in FIG. 3, stub transmission line 18 is isolated from the main transmission line by terminating holes 134 and 135. Terminating holes 130–135 are of the type illustrated at 13 in FIG. 2. In the delay line arrangement illustrated in FIG. 3, a signal applied to input terminal 12 traverses stub transmission lines 16 and 17 and intermediate portions of main transmission line 70 before reaching output terminal 14.

The lengths of the stub transmission lines may be controlled by the proper selection of orthogonal signal conductors on opposite sides of panel 1 between which connecting holes are formed. For example, stub transmission line 16, formed by sections of signal conductors 30, 72 and 31, is longer than stub transmission line 17 formed by sections of signal conductors 32, 71 and 31.

Upon formation of stub transmisison lines of suitable length by provision of properly located connecting holes, the effective length of the delay line is established by diverting the signal through a given stub transmission line or disconnecting the stub transmission line from the main transmission line by properly located terminating holes. Thus, assuming the length of the main transmission line signal conductor 70, in the embodiment illustrated in FIG. 3, to be L and the length of the transverse stub transmission line signal conductors 30–35 between signal conductors 70 and 71 and between signal conductors 71 and 72 to be Z, the configuration of FIG. 3 permits variation in delay line length from L to $L+10Z$, in increments of 2Z. In a delay line constructed in accordance with the invention, a delay of one nanosecond per seven inches was obtained. Assuming that $L=2$ inches and $Z=1$ inch, the range of delay time provided by the embodiment of FIG. 3 is from 0.285 nanosecond to 1.714 nanoseconds.

The variable length signal delay line of the invention thus facilitates variation of the propagation delay of a signal or signals and facilitates the attainment of a desired time relationship without the incorporation of artificial delay lines. The variable length signal delay line of the invention is easily adapted to automated manufacturing techniques and has the desirable high frequency characteristics of a coaxial cable but, unlike a coaxial cable, the length of the signal path can be easily altered.

While the principles of the invention have been described with reference to a specific embodiment, there will be immediately obvious to those skilled in the art many modifications in structure, arrangement, proportions, elements, materials and components used in the practice of the invention, and otherwise which are particularly adapted to specific environments and operating requirements, without departing from these principles. The appended claims are therefore intended to cover and embrace any such modifications, within the limits only of the true spirit and scope of the invention.

What is claimed as new and desired to be secured by Letters Patent of the United States is:

1. A variable length signal delay line comprising: a main signal transmission line having an input terminal and an output terminal and a plurality of pairs of terminals spaced along the length of said main signal transmission line, a plurality of stub signal transmission lines, each stub signal transmission line being connected between the terminals of one of said pairs of terminals, and means for selectively interrupting said main signal transmission line between the terminals of selected ones of said pairs of terminals to divert a signal applied to said input terminal from said main signal transmission line through corresponding ones of said stub signal transmission lines to increase the effective length of the signal path between said input and output terminals.

2. The variable length signal delay line of claim 1 which includes means for disconnecting from said main signal transmission line the stub transmission lines through which said signal is not diverted.

3. A variable length signal delay line comprising: an insulative panel having a pair of sides, a plurality of grooves formed in each of said sides, the grooves in one of said sides being disposed transverse to the grooves in the other of said sides, a conductor in each of said grooves, the conductors in alternate grooves serving as signal conductors, one of said signal conductors having input and output terminals and serving as the main signal transmission line, means for interconnecting portions of selected ones of the remaining signal conductors to provide at least one stub signal transmission line in parallel with said main transmission line, means interconnecting the remaining conductors to provide a shield for said main signal and stub signal transmission lines, and means for diverting a signal applied to said main transmission line through said stub transmission line to increase the effective length of the signal path between said input and output terminals.

4. A variable length signal delay line comprising: an insulative panel having a pair of sides, a plurality of grooves formed in each of said sides, the grooves in one of said sides being disposed transversely to the grooves in the other of said sides, a plurality of signal conductors, one of said conductors being arranged in each of at least some of said grooves, one of said conductors having input and output terminals and serving as the main signal transmission line, means for interconnecting portions of selected ones of the remaining conductors to provide at least one stub signal transmission line in parallel with said main transmission line, and means for diverting a signal applied to said main transmission line through said stub transmission line to increase the effective length of the signal path between said input and output terminals.

5. A variable length signal delay line comprising: an insulative panel having a pair of sides, a plurality of grooves formed in each of said sides, the grooves in one of said sides being disposed transversely to the grooves in the other of said sides, a signal conductor in each of said grooves, one of said signal conductors having input and output terminals and serving as the main signal transmission line, means for interconnecting portions of selected ones of the remaining signal conductors to provide at least one stub signal transmission line in parallel with said main transmission line, and means for interrupting said main transmission line between spaced points to divert a signal applied to said input terminal of said main transmission line through said stub transmission line to increase the effective length of the signal path between said input and output terminals.

References Cited

UNITED STATES PATENTS 2,190,131 2/1940 Alford ---------- 333—31

ROY LAKE, *Primary Examiner.*

DARWIN R. HOSTETTER, *Examiner.*